US011590707B2

(12) United States Patent
Costabeber et al.

(10) Patent No.: US 11,590,707 B2
(45) Date of Patent: Feb. 28, 2023

(54) MULTI-STATION STEREOLITHOGRAPHIC GROUP

(71) Applicant: DWS S.R.L., Thiene (IT)

(72) Inventors: Ettore Maurizio Costabeber, Zane (IT); Renzo Busato, Marano Vicentino (IT)

(73) Assignee: DWS S.R.L., Thiene (IT)

( * ) Notice: Subject to any disclaimer, the term of this patent is extended or adjusted under 35 U.S.C. 154(b) by 477 days.

(21) Appl. No.: 16/639,022

(22) PCT Filed: Nov. 12, 2018

(86) PCT No.: PCT/IB2018/058854
§ 371 (c)(1),
(2) Date: Feb. 13, 2020

(87) PCT Pub. No.: WO2019/097383
PCT Pub. Date: May 23, 2019

(65) Prior Publication Data
US 2020/0223142 A1   Jul. 16, 2020

(30) Foreign Application Priority Data

Nov. 14, 2017   (IT) .................. 102017000129515

(51) Int. Cl.
| | |
|---|---|
| *B29C 64/379* | (2017.01) |
| *B33Y 30/00* | (2015.01) |
| *B29C 64/241* | (2017.01) |
| *B29C 64/35* | (2017.01) |
| *B33Y 40/20* | (2020.01) |

(52) U.S. Cl.
CPC .......... *B29C 64/379* (2017.08); *B29C 64/241* (2017.08); *B29C 64/35* (2017.08); *B33Y 30/00* (2014.12); *B33Y 40/20* (2020.01)

(58) Field of Classification Search
CPC ............................ B29C 64/241; B29C 64/124
See application file for complete search history.

(56) References Cited

U.S. PATENT DOCUMENTS

2012/0195994 A1   8/2012  El-Siblani et al.
2014/0339741 A1*  11/2014 Aghababaie .......... B29C 64/255
                                                          264/401

(Continued)

FOREIGN PATENT DOCUMENTS

| JP | H05-212974 | 8/1993 |
| JP | H07-60844  | 3/1995 |

OTHER PUBLICATIONS

International Search Report dated Mar. 13, 2019, issued in PCT Application No. PCT/IB2018/058854, filed Nov. 12, 2018.

*Primary Examiner* — Yung-Sheng M Tsui
*Assistant Examiner* — Melody Tsui
(74) *Attorney, Agent, or Firm* — Volpe Koenig

(57) ABSTRACT

A multi-station stereolithographic group, includes: support and movement apparatus for a modelling plate with respect to a fixed base facing the modelling plate, the fixed base including at least two work stations positioned in respective areas able to be reached by the modelling plate moved by the support and movement apparatus. Such a fixed base includes at least three work stations: at least one first station for forming an object, at least one second station for washing a formed object, at least one third station for stabilising a formed object.

8 Claims, 6 Drawing Sheets

(56) References Cited

U.S. PATENT DOCUMENTS

2016/0096331 A1* 4/2016 Linnell ................ B29C 64/393
264/494
2018/0162068 A1* 6/2018 Chen ..................... B29C 64/129

* cited by examiner

MULTI-STATION STEREOLITHOGRAPHIC GROUP

BACKGROUND OF THE INVENTION

1. The Field of the Invention

The invention concerns a multi-station stereolithographic group.

2. The Relevant Technology

Currently, rapid prototyping and particularly stereolithography techniques are increasingly common.

A generic stereolithographic process is usually based on photopolymerisation, thanks to which a body is made from a photosensitive liquid resin, called photopolymer, which solidifies under the exposure of a laser ray, typically ultraviolet, which scans the surface of the resin.

Such resins are formulated with photo-initiators and liquid monomers, which can also contain binders and other substances capable of giving the product the required mechanical and chemical characteristics.

Photopolymerisation is the process that makes it possible to connect the monomers in cross-linked molecules of larger size.

For most rapid prototyping systems, the step of making a body through processing of a photosensitive resin is completely automated, and often the workers leave the machine running overnight since the process can take many hours and the worker can no longer intervene once the operation is started.

The subsequent end steps of the process, on the other hand, are largely manual, and it is thus necessary to take great care and they are carried out delicately since the risk of damaging the prototype with an incorrect manoeuvre is high.

A first end step consists of a washing, or cleaning, process, through which the resin left on the body that has been made is eliminated.

Such a washing process provides for introducing the body that has been made in a bath of a cleaning liquid for a certain time, stirring such a liquid every so often to optimise the operation.

A second end step consists of subjecting the washed body to a curing step, known as a post-curing step, for example through heating, again for example heating with ultraviolet rays or thermal heating, so as to increase the mechanical characteristics of the body that has been made; the relative rotation between body and post-curing means, i.e., UV ray emitters or heating elements, is generally considered important, so that the curing is as even as possible.

Such steps, making, washing and post-curing, are each carried out with a suitable apparatus, and one or more workers take care of the intermediate steps of moving a body from one apparatus to the other.

Such intermediate steps, as stated above, are managed by the workers with great caution, so as not to ruin what has been made with the apparatuses, and such caution runs contrary to the speed often required to complete all of the steps of making a body produced through stereolithography and provide the finished body to an end user.

Patent US 2012/0195994 A1 concerns an apparatus for making three-dimensional objects using a plurality of different solidifiable materials.

Such an apparatus comprises at least two forming stations, each containing a solidifiable material, at least one washing station, and a mobile platform for the movement of a modelling plate from one station to another.

SUMMARY OF THE INVENTION

The task of the present invention is to devise a multi-station stereolithographic group capable of avoiding the quoted drawbacks and limitations of the prior art.

In particular, a purpose of the invention is to devise a stereolithographic group capable of limiting the intervention of a worker between two successive steps of a process for making a body through stereolithography.

Another purpose of the invention is to devise a stereolithographic group capable of higher production rates than currently known apparatuses.

A further purpose of the invention is to devise a stereolithographic group of efficiency, productivity and manufacturing quality not less than known apparatuses.

The task as well as the aforementioned purposes are accomplished by a multi-station stereolithographic group according to claim 1.

Further characteristics of the stereolithographic group according to claim 1 are described in the dependent claims.

BRIEF DESCRIPTION OF THE DRAWINGS

The task and the aforementioned purposes, together with the advantages that will be mentioned hereinafter, are highlighted hereinbelow by the description of an embodiment of the finding, which is given, for indicating but not limiting purposes, with reference to the attached tables of drawings, where.

DETAILED DESCRIPTION OF THE PREFERRED EMBODIMENTS

Figure 1:
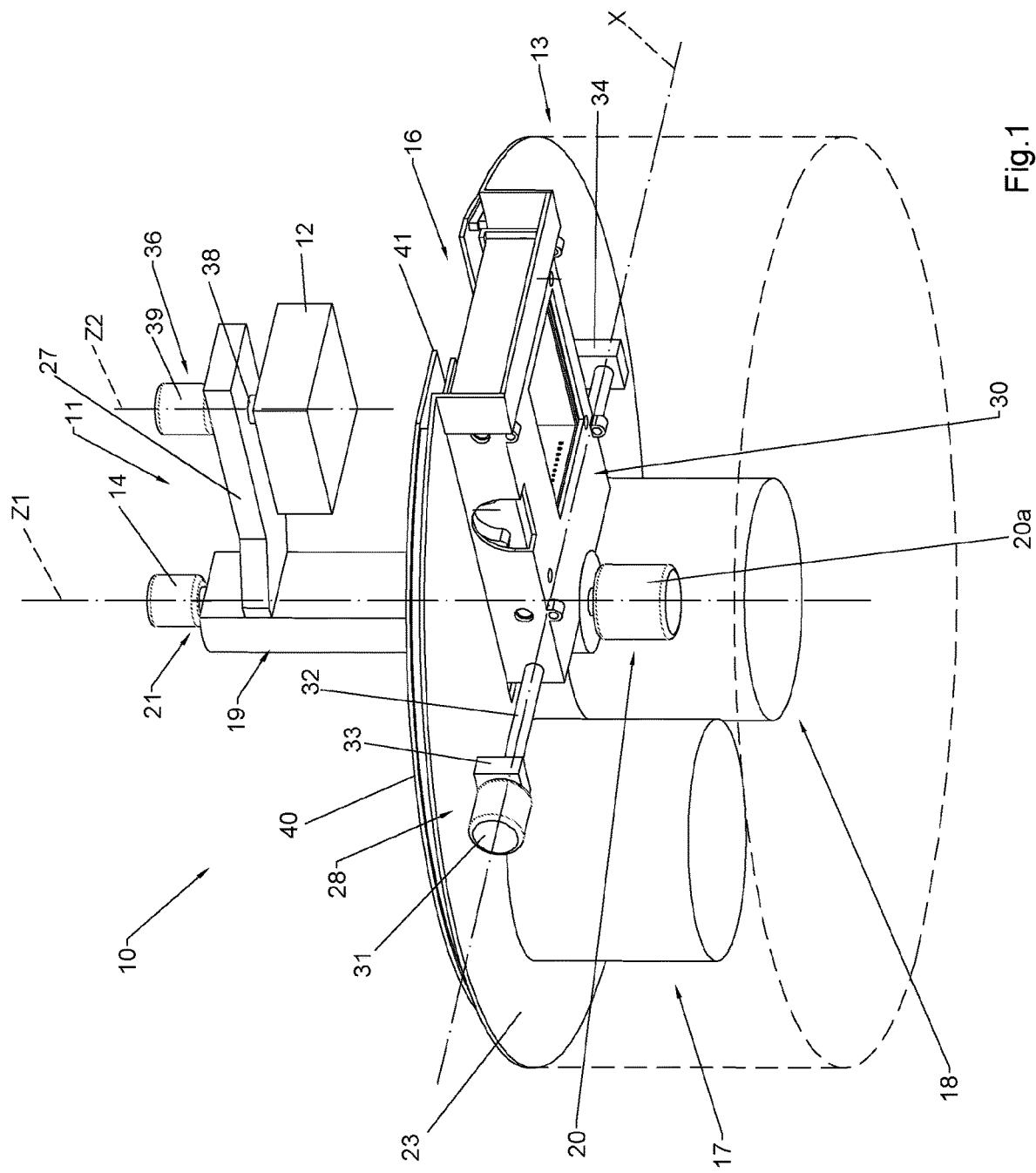
FIG. 1 represents a perspective view of the stereolithographic group according to the invention.

With reference to the quoted figures, a multi-station stereolithographic group according to the invention is wholly indicated with reference numeral 10.

Such a multi-station stereolithographic group 10 comprises:
- support and movement means 11 for a modelling plate 12 with respect to a fixed base 13 facing the modelling plate 12,
- said fixed base 13 comprising at least two work stations 16 and 17, described better hereinbelow, positioned in respective areas able to be reached by the modelling plate 12 moved by the support and movement means 11.

The special feature of the stereolithographic group 10 according to the invention is the fact that the fixed base 13 comprises three work stations 16, 17 and 18:
- a first station 16 for forming an object,
- a second station 17 for washing a formed object,
- a third station 18 for stabilising a formed object; such an operation is known in the field by the term 'post-curing'.

The stereolithographic group 10 according to the invention should of course be considered to be able to have more than one first station, more than one second station, more than one third station, and other stations of different types with respect to such first, second and third stations.

Figure 2:
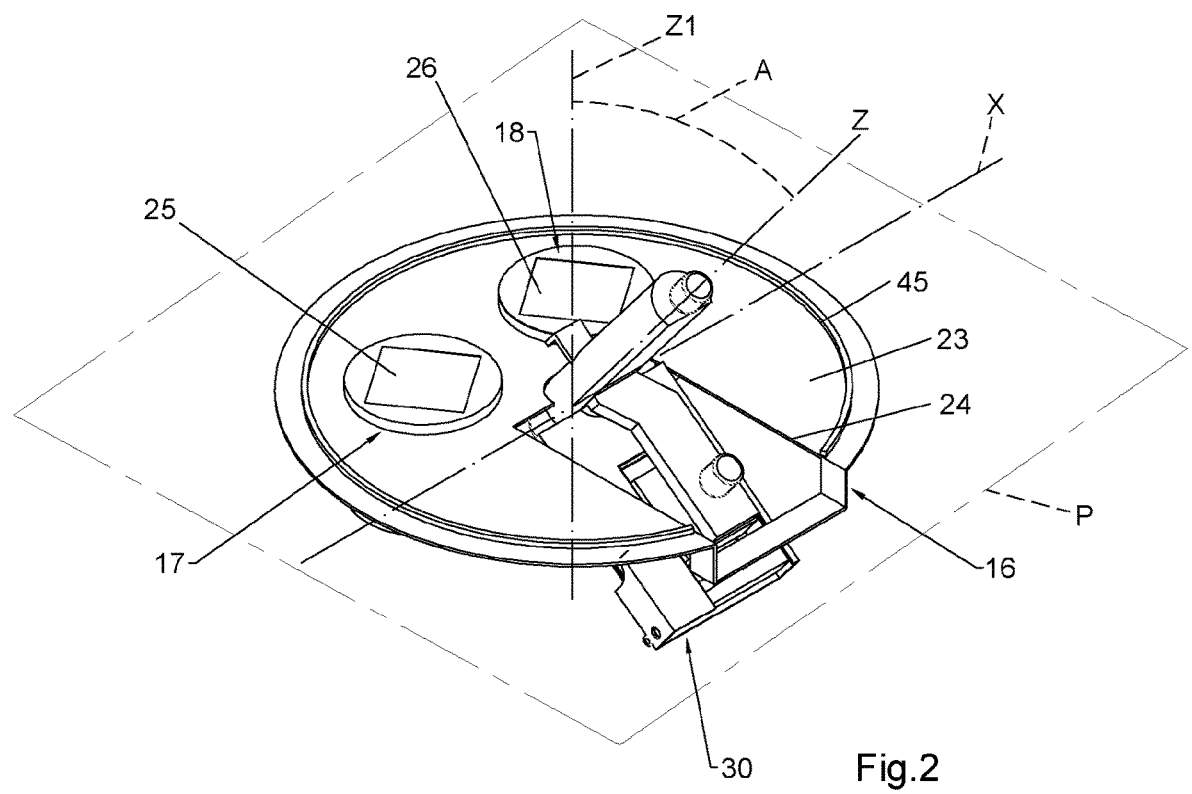
FIG. 2 represents another perspective view of the stereolithographic group according to the invention.
Figure 5:
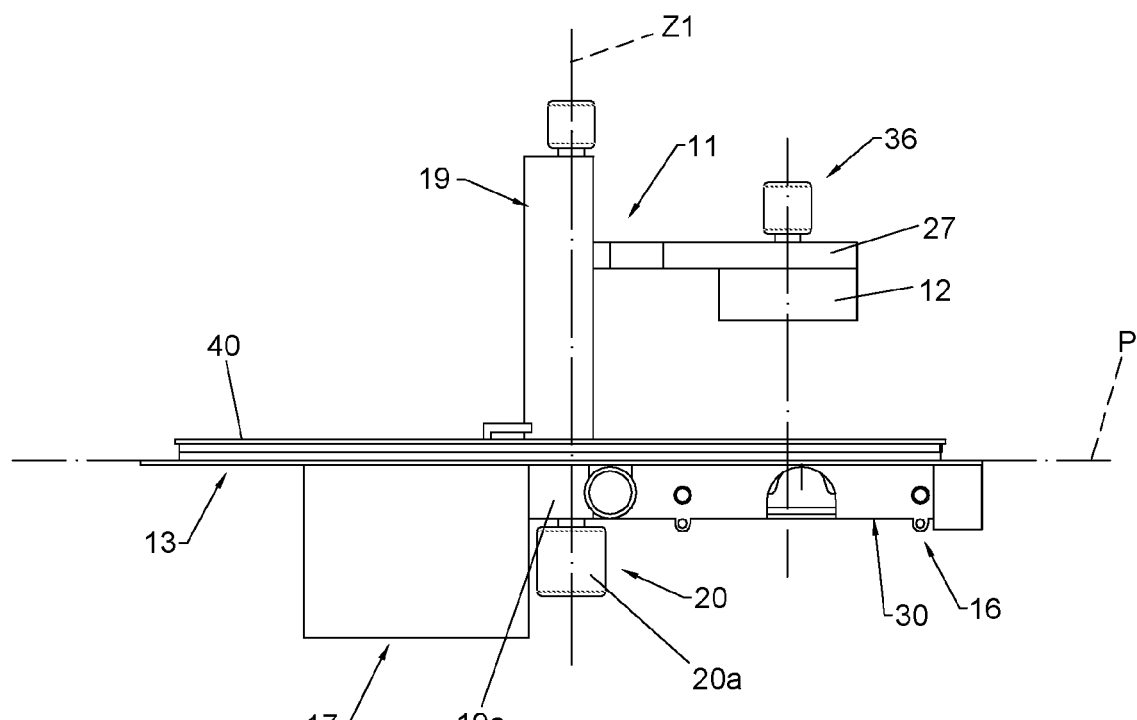
FIG. 5 represents a side view of the stereolithographic group according to the invention in a first use position and in the second operating configuration.

In the embodiment described here only as a non-limiting example of the invention, the support and movement means 11 comprise:
- a tower 19 for supporting the modelling plate 12, such a support tower 19 extending from the fixed base 13 in a main direction of extension Z transversal with respect to a reference plane P, indicated in FIGS. 2 and 5, of the fixed base 13,
- means 20 for the rotation of the tower 19 with respect to the fixed base 13 about a rotation axis perpendicular to the reference plane P,
- means 21 for the movement of the modelling plate 12 away from and towards the fixed base 13.

The means 21 for the movement of the modelling plate 12 away from and towards the fixed base 13 comprise actuator means for the translation of the plate 12 in the main direction of extension Z of the tower 19.

As an example, such translation actuator means in the direction Z consist of a volute and worm screw device, actuated by an electric motor 14 carried by the same tower 19, and adapted for translating a support arm 27.

Such a support arm 27 extends canti-levered from the tower 19 in a transversal direction with respect to the main direction Z of extension of the tower 19.

In particular, the support arm 27 extends perpendicular to the main direction Z of extension of the tower 19.

In the present embodiment of the invention, the rotation of the tower 19 takes place about an axis Z1, perpendicular to the reference plane P, when the main direction of extension Z of the tower 19 is parallel to the axis Z1.

The fixed base 13, in the example described here, has a cylindrical shape, as schematised for the sake of simplicity in FIG. 1; of course, such a fixed base 13, in other variant embodiments not illustrated for the sake of simplicity, has a different shape, for example parallelepiped, depending on needs and the technical requirements.

Such a fixed base 13 has an upper plate 23, for example a disc-shaped plate, on which corresponding access openings 24, 25 and 26 to the corresponding first 16, second 17 and third 18 stations are defined.

The support and movement means 11 also comprise means 28 for the rotation of the tower 19 about an axis X parallel to the reference plane P.

Figure 3:
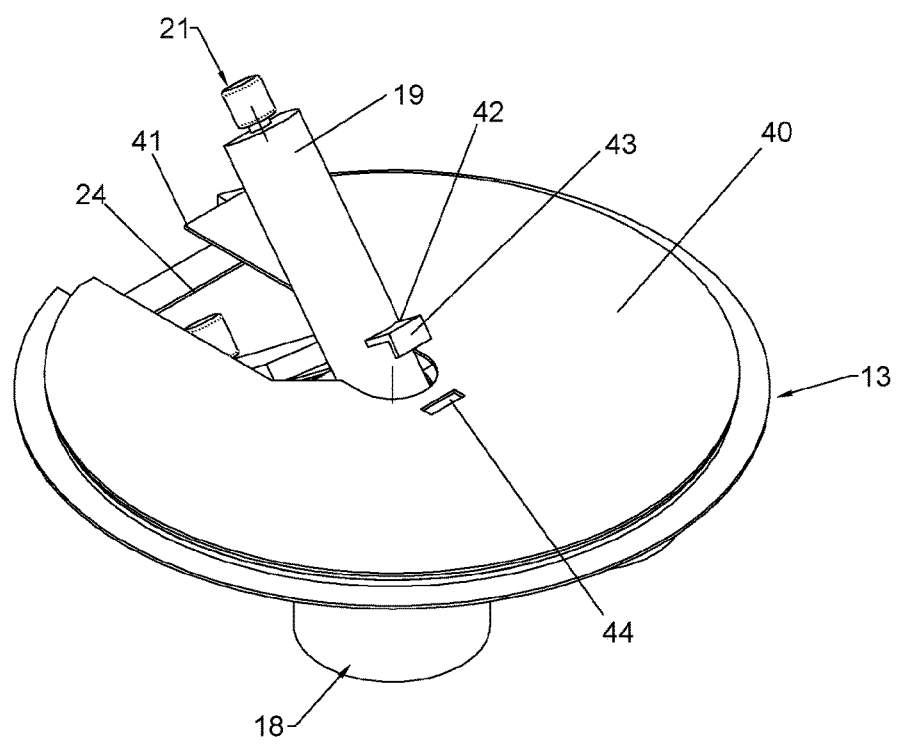
FIG. 3 represents a further perspective view of the stereolithographic group according to the invention in a first operating configuration.

Such means 28 for the rotation of the tower 19 about an axis X parallel to the reference plane P are configured to rotate the tower 19 between a first configuration rotated downwards, with the main direction of extension Z rotated by an angle A with respect to the axis Z1 perpendicular to the reference plane P, according to FIGS. 2 and 3, for the operation of the first station 16 for forming an object, and a second configuration rotated upwards, with the direction of extension Z parallel to the perpendicular rotation axis Z1 and zero angle A.

Such an angle A is preferably, but not exclusively, greater than or equal to 20°; in particular, such an angle A is preferably 35°.

The first station 16 comprises a transparent bottom tank 30, intended to contain a photosensitive resin for making a body through stereolithography, beneath which corresponding means for emitting an electromagnetic radiation operate, not illustrated for the sake of simplicity and deemed to be of the per se known type.

The stereolithographic process made is of the type known as "layer-by-layer".

In a variant embodiment, the stereolithographic process made is of the type known as "continuous SLA", which provides for the continuous movement of the modelling plate along an axis parallel to the axis Z instead of the division in layers, i.e., instead of movement in steps, each step corresponding to the forming of a layer, like in the layer by layer process.

The tank 30 is configured so as to rotate about the axis X together with the tower 19, so that the tank 30 takes up an inclined configuration for optimising its operation.

The means 28 for the rotation of the tower 19 about an axis X comprise, for example, a gearmotor 31, or a motor devoid of reduction means, adapted for rotating a shaft 32 in turn fixed to the tank 30.

The tank 30 has a part 19a for supporting the tower 19.

The tower 19 thus extends from such a support part 19a, and is rotatable with respect to it.

The support part 19a is fixedly connected to the tank 30.

The tower 19 is set in rotation with respect to the support part 19a by the gearmotor, or motor, 31.

The shaft 32 is supported by two opposite brackets 33 and 34, and passes through two through-holes each defined on a corresponding bracket of the two opposite brackets 33 and 34.

Such brackets 33 and 34 are fixed beneath the upper disc-shaped plate 23, as can be clearly seen in FIG. 1.

The means 20 for the rotation of the tower 19 with respect to the fixed base 13 about a rotation axis perpendicular to the reference plane P comprise a gearmotor, or motor, 20a, fixed to the support part 19a of the tank 30.

Such a gearmotor or motor 20a is adapted for determining the rotation, in one direction or in the opposite direction, of the tower 19 with respect to the support part 19a and about the rotation axis Z1.

In the embodiment described here as a non-limiting example of the invention, the first station 16, the second station 17 and the third station 18 are positioned so that the rotation of the tower 19 about its rotation axis Z1, perpendicular to the reference plane P, determines the alternative positioning of the modelling plate 12 above one of such first, second or third stations.

Such first 16, second 17 and third 18 stations thus lie substantially on a circular trajectory lying on the reference plane P.

In this way, such first 16, second 17 and third 18 stations can be reached by using a support arm 27 of fixed length.

It should be considered that the invention encompasses a variant embodiment in which the support arm 27 is of variable length with corresponding automatic lengthening and shortening means.

In this case, the first 16, second 17 and third 18 stations can be positioned in another way, for example aligned along a straight line.

In the present embodiment, the second station 17 can be reached with a rotation of 135° about the axis Z1 from the first station 16.

The third station 18 can be reached with a rotation of 90° about the axis Z1 from the second station 17.

The first station 16 can be reached with a rotation of 135° about the axis Z1 from the third station 18.

The second station 17, for washing a formed object, comprises, for example, a tank for containing a washing liquid.

The third station 18, for stabilising a formed object, comprises, for example, a space for containing the plate 12, inside which the formed and washed object, carried by the plate 12, is subjected to the action of stabilisation means of the formed object, i.e., post-curing means.

Such post-curing means comprise one or more bulbs emitting ultraviolet light, or one or more heating elements, or both one or more bulbs emitting ultraviolet light, and one or more heating elements.

Such a third post curing station 18 is configured to subject the formed object to a "UV Curing" treatment.

Alternatively, the third station 18 is configured to subject the formed object to a "thermal curing" treatment, i.e., a completion treatment of the curing step through the heating of the object, since the use of such a technique is becoming increasingly common.

Further alternatively, the third station 18 is configured to subject the formed object to a treatment that combines UV Curing and thermal curing, to obtain the maximum drying speed.

The modelling plate 12 is constrained to the support arm 27 through means 36 for the rotation of the modelling plate 12 itself.

Such rotation means 36 of the modelling plate 12 with respect to the support arm 27 comprise a pin 38 fixedly connected to the modelling plate 12 and rotated through a motor 39.

The rotation pin 38 of the modelling plate 12 has a rotation axis Z2 parallel to the main direction Z of extension of the tower 19.

Such a pin 38 has its rotation axis Z2 parallel to the axis Z1 of rotation of the tower 19 when it is in the second configuration with main direction of extension Z parallel to the axis for its rotation Z1.

The motor 39 is mounted on the support arm 27.

Such rotation means 36 of the modelling plate 12 makes it possible to rotate the same modelling plate 12 inside the tank of the second washing station 17, making it possible to carry out a highly efficient and precise washing operation even in the absence of means for moving the washing liquid associated with the tank itself.

Such rotation means 36 of the modelling plate 12 allow the same modelling plate 12 to be rotated inside the containment space of the third station 18, making it possible to carry out a highly efficient and precise post-curing operation even in the absence of means for moving the bulbs emitting ultraviolet light, or the heating elements, about the plate 12.

The stereolithographic group 10 according to the invention also comprises a cover 40 configured to allow access to only one of said access openings 24, 25 and 26 of the first 16, second 17 and third 18 stations and to obstruct the other access openings.

Such a cover 40, in the present embodiment, comprises a rotary disc equipped with a passage window 41 extending so as to surround the low part of the tower 19 and of dimensions such as to allow the passage of the modelling plate 12.

The cover 40 rotates together with the tower 19 when it is in the second configuration with its main direction of extension Z parallel to the perpendicular rotation axis Z1.

Figure 4:
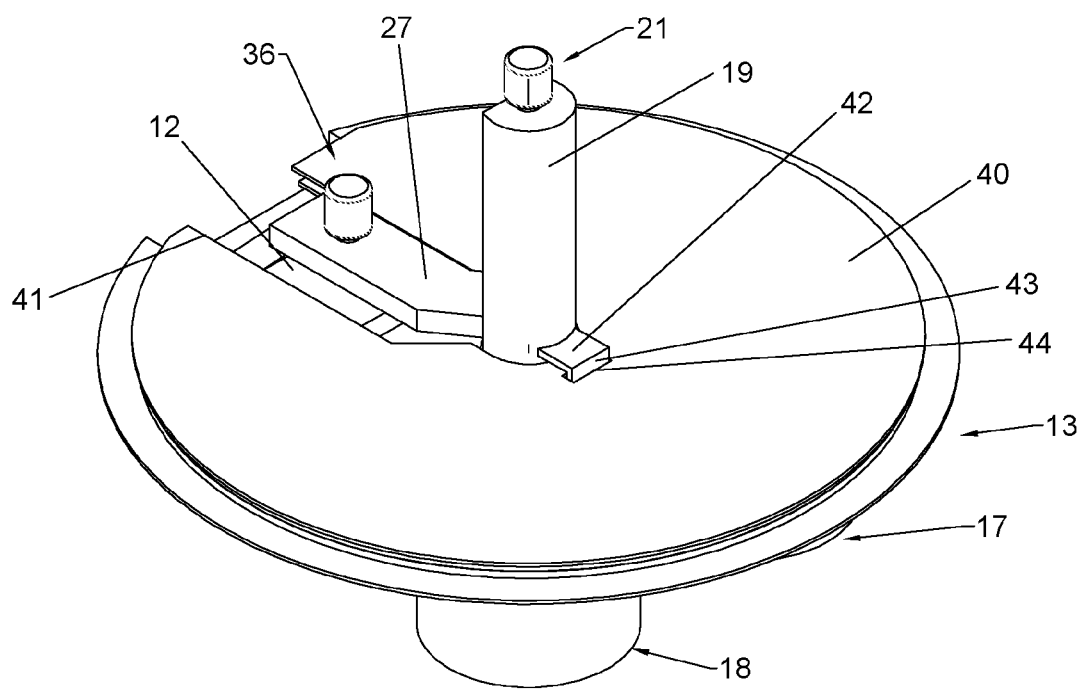
FIG. 4 represents the same perspective view of FIG. 3 of the stereolithographic group according to the invention, in a second operating configuration.

In order to rotate together with the tower 19, the cover 40 has a fastening appendage 42, clearly visible in FIGS. 3 and 4, extending in the radial direction from a segment of the tower 19 arranged close to the cover 40, having a fastening tooth 43 adapted for being inserted in a corresponding countershaped fastening hole 44 defined on the cover 40 itself, when the tower 19 is in the second configuration with main direction of extension Z parallel to the perpendicular rotation axis Z1.

When the tower 19 is inclined downwards for the operation of the first station 16, in the first configuration, the fastening appendage 42 is disengaged from the fastening hole 44 and the cover 40 is not, in such a situation, capable of rotating.

When the tower 19 is in the second configuration with main direction of extension Z parallel to the perpendicular rotation axis Z1, the fastening appendage 42 is coupled with the fastening hole 44 and the rotation of the tower 19 leads to the cover 40 being set in rotation.

The rotation of the tower 19 thus results in the simultaneous rotation of the cover 40.

The rotation of the cover 40 together with the tower 19 determines the accessibility of a station and the simultaneous closure of the other stations.

The rotation of the cover 40 is accompanied by a circular guide rib 45, extending from the upper disc-shaped plate 23 and adapted for ensuring the correct centering of the cover 40 with respect to the rotation axis of the tower 19.

Figure 6:
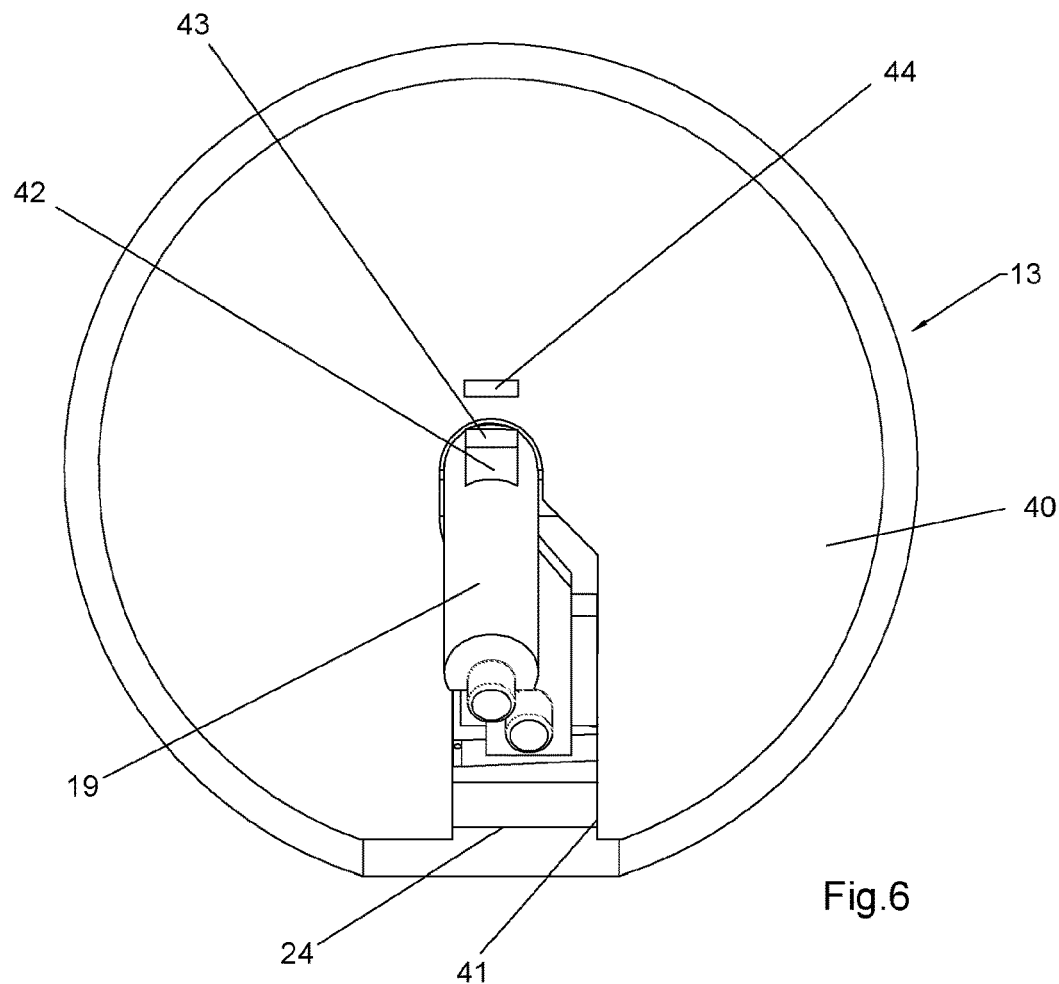
FIG. 6 represents a plan view from above of the stereolithographic group according to the invention in the first use position and in the first operating configuration.
Figure 7:
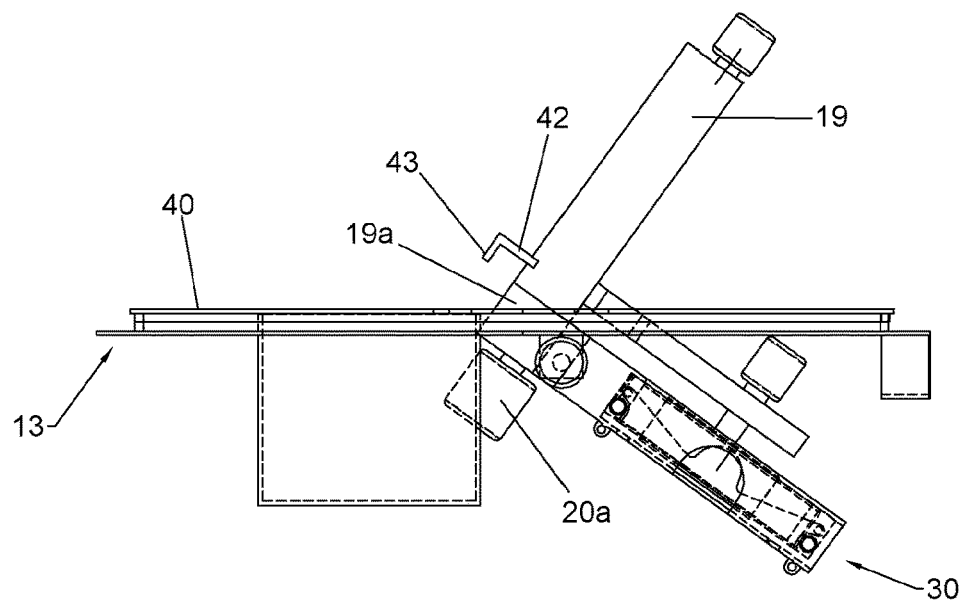
FIG. 7 represents a side view of the stereolithographic group in the first position of FIG. 6.

FIGS. 6 and 7 give an example of a first use position of the stereolithographic group 10 in the first operating configuration, i.e., with tower 19 inclined together with the tank 30 in an operating configuration of the first station 16.

Figure 8:
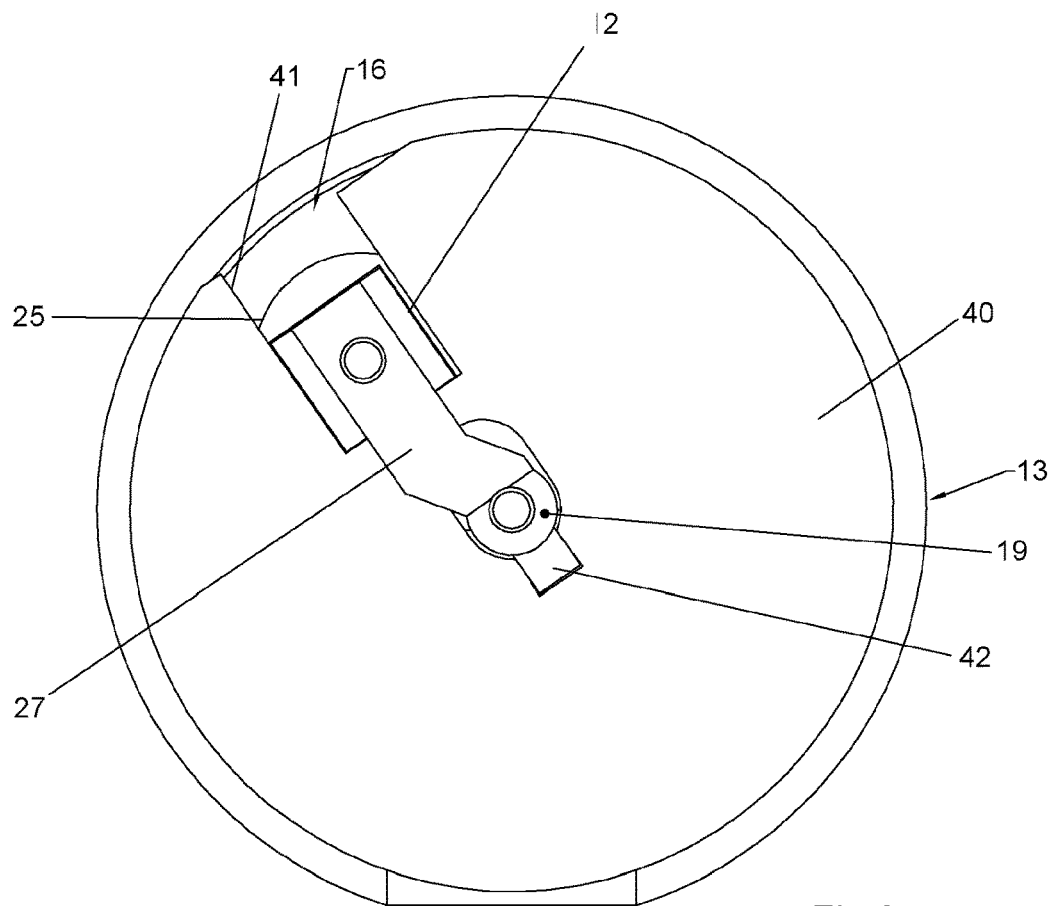
FIG. 8 represents a plan view from above of the stereolithographic group according to the invention in a second use position.
Figure 9:
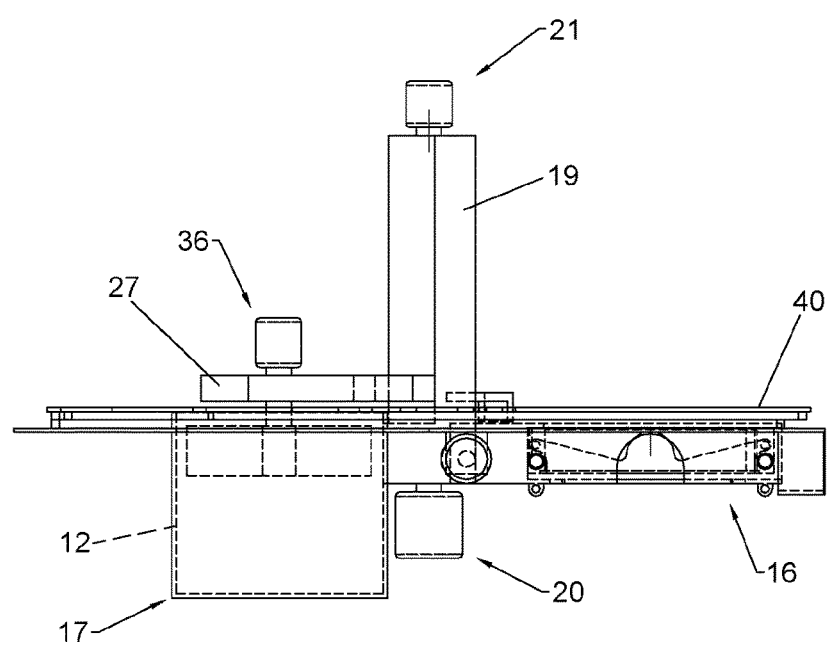
FIG. 9 represents a side view of the stereolithographic group in the second position of FIG. 8.

FIGS. 8 and 9 give an example of a second use position of the stereolithographic group 10 in the second operating configuration, with tower 19 having axis Z perpendicular to the reference plane P of the base 13 and modelling plate 12 fitted inside the second washing station 17.

Figure 10:
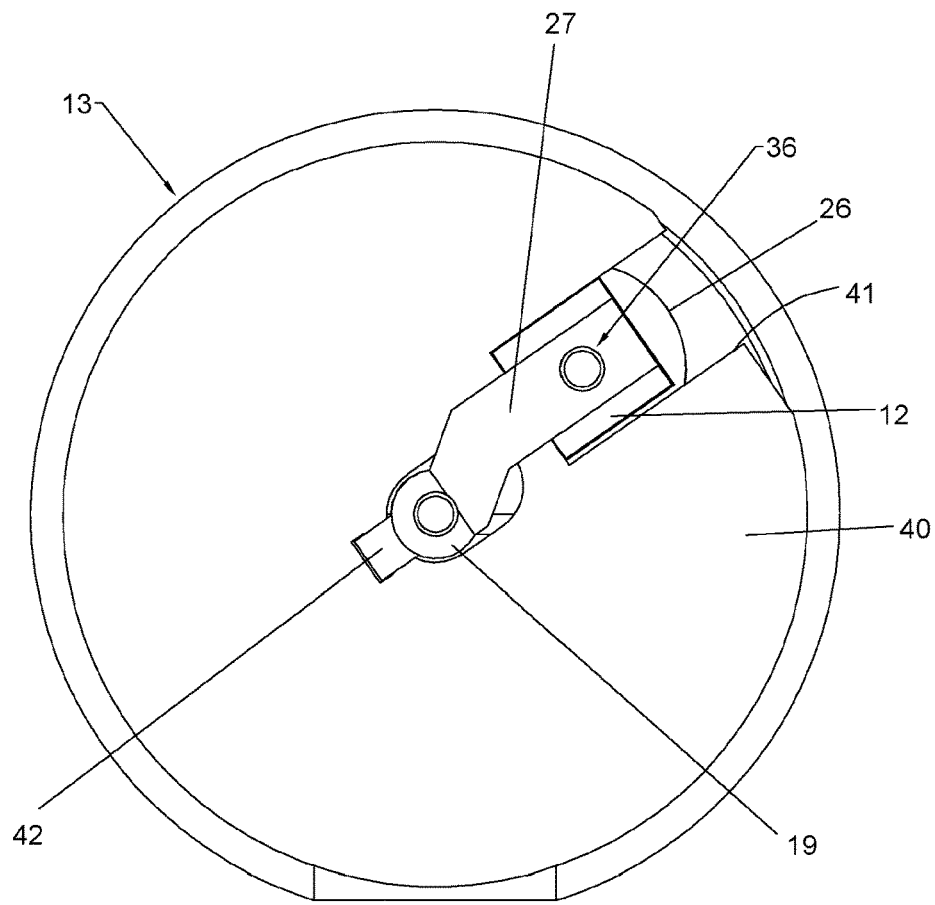
FIG. 10 represents a plan view from above of the stereolithographic group according to the invention in a third use position.
Figure 11:
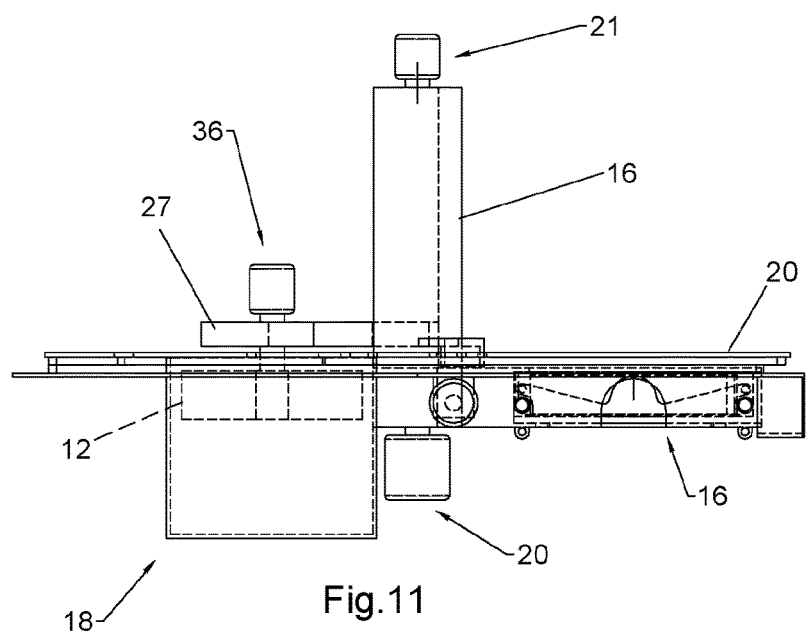
FIG. 11 represents a side view of the stereolithographic group in the second position of FIG. 10.

FIGS. 10 and 11 give an example of a third use position of the stereolithographic group 10, in the second operating configuration, with tower 19 having axis Z perpendicular to the reference plane P of the base 13 and modelling plate 12 fitted inside the third post-curing station 18.

In practice, it has been seen how the finding achieves the task and the preset purposes.

In particular, with the finding a stereolithographic group has been devised that is capable of limiting the intervention of a worker between two successive steps of a process for making a body through stereolithography, thanks to the support and movement means for the modelling plate adapted for automatically moving the modelling plate between three or more operating stations each having a specific functionality.

Moreover, with the invention a stereolithographic group has been devised that is capable of higher production rates with respect to currently known apparatuses, thanks to the high automation of which the group itself is capable.

Moreover, with the invention a stereolithographic group has been devised that has efficiency, productivity and quality not less than known apparatuses.

The finding thus conceived can undergo numerous modifications and variants, all of which are encompassed by the inventive concept; moreover, all of the details can be replaced by other technically equivalent elements.

In practice, the components and the materials used, provided that they are compatible with the specific use, as well as the contingent shapes and sizes, can be whatever according to the requirements and the state of the art.

Where the characteristics and the techniques mentioned in any claim are followed by reference marks, such reference marks should be considered applied only for the purpose of increasing the intelligibility of the claims and consequently such reference marks have no limiting effect on the interpretation of each element identified as an example by such reference marks.

The invention claimed is:

1. A multi-station stereolithographic system, comprising:
    support and movement means for a modelling plate with respect to a fixed base facing said modelling plate,
    the modelling plate attached to the support and movement means,
    said fixed base comprising at least three work stations positioned in respective areas able to be reached by said modelling plate moved by said support and movement means,
    the at least three work stations comprising:
        at least one first station configured for forming an object,
        at least one second station configured for washing a formed object,
        at least one third station configured for a post-curing process of a formed object,
    said support and movement means comprising:
    a tower configured for supporting said modelling plate, said support tower extending from said fixed base in a main direction of extension transversal with respect to a reference plane of said fixed base,
    a motor configured for the rotation of said tower with respect to the fixed base about a rotation axis perpendicular to the reference plane,
    an actuator configured for the movement of the modelling plate away from and towards said fixed base, and
    a motor configured for the rotation of said tower about an axis parallel to the reference plane.

2. The stereolithographic system according to claim 1, wherein said means for the movement of the modelling plate away from and towards said fixed base comprise an actuator for the translation of the plate in the main direction of extension of said tower.

3. The stereolithographic system according to claim 1, wherein said fixed base has an upper plate on which corresponding access openings to corresponding first, second and third stations are defined.

4. The stereolithographic system according to claim 1, wherein said first station comprises a transparent bottom tank, intended for containing a photosensitive resin for making a body through stereolithography, beneath which corresponding emission means of an electromagnetic radiation operate.

5. The stereolithographic system according to claim 4, wherein said tank is configured to rotate together with the tower about said axis parallel to said reference plane so that the tank takes up an inclined configuration for optimising its operation.

6. The stereolithographic system according to claim 1, wherein said first station, said second station and said third station lie substantially on a circular trajectory lying on the reference plane.

7. The stereolithographic system according to claim 1, wherein said modelling plate is constrained to said support arm through means for the rotation of the modelling plate itself.

8. The stereolithographic system according to claim 1, further comprising a cover configured to allow access to only one of said access openings of the first, the second and the third stations and to obstruct the other access openings.

* * * * *